(12) United States Patent
Pratt et al.

(10) Patent No.: US 10,572,558 B2
(45) Date of Patent: Feb. 25, 2020

(54) METHOD AND SYSTEM FOR PROVIDING EXPERTISE COLLABORATION

(71) Applicant: AT&T INTELLECTUAL PROPERTY I, LP, Atlanta, GA (US)

(72) Inventors: James Pratt, Round Rock, TX (US); William Knotts, Driftwood, TX (US); Martin McEnroe, Plano, TX (US); Jun Yan, Union City, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 518 days.

(21) Appl. No.: 15/063,035

(22) Filed: Mar. 7, 2016

(65) Prior Publication Data
US 2017/0255701 A1    Sep. 7, 2017

(51) Int. Cl.
*G06F 17/00* (2019.01)
*G06F 7/00* (2006.01)
*G06F 16/9535* (2019.01)
*H04L 29/08* (2006.01)
*H04L 12/26* (2006.01)

(52) U.S. Cl.
CPC ......... *G06F 16/9535* (2019.01); *H04L 43/04* (2013.01); *H04L 67/22* (2013.01)

(58) Field of Classification Search
CPC . G06F 17/30867; H04L 43/04; H04L 51/046; H04L 67/22
USPC ........................................................ 707/723
See application file for complete search history.

(56) References Cited

U.S. PATENT DOCUMENTS

| | | | | |
|---|---|---|---|---|
| 6,275,812 B1* | 8/2001 | Haq | ............... | G06Q 10/063112 705/7.14 |
| 7,370,276 B2* | 5/2008 | Willis | ................. | G06F 16/9535 715/747 |
| 7,593,860 B2* | 9/2009 | Mitchell | ............. | G06Q 10/105 434/219 |
| 8,412,564 B1* | 4/2013 | Thell | ................ | G06Q 10/06398 705/7.42 |

(Continued)

FOREIGN PATENT DOCUMENTS

WO    2009035618 A2    3/2009

OTHER PUBLICATIONS

Herlocker, Jonathan L. , "Understanding and improving automated collaborative filtering systems." Diss. University of Minnesota, 2000., 2000.

(Continued)

*Primary Examiner* — Pavan Mamillapalli
(74) *Attorney, Agent, or Firm* — Guntin & Gust, PLC; Ralph Trementozzi

(57) ABSTRACT

Aspects of the subject disclosure may include, for example, monitoring for storage of information, determining a subset of the information that satisfies an originality threshold, determining the subset of the information satisfies a shareability criterion, generating metadata that includes a first identification of a first user associated with generating the subset of the information via the user interface of the first computing device and a second identification of a topic of the subset of the information and responsive to a match between a data request and the topic of information, providing a computing device with access to the first identification of the first user and to the stored information. Other embodiments are disclosed.

20 Claims, 10 Drawing Sheets

(56) References Cited

U.S. PATENT DOCUMENTS

| | | | |
|---|---|---|---|
| 8,417,653 B2 | 4/2013 | Probst et al. | |
| 8,463,775 B2 | 6/2013 | Sidhu et al. | |
| 8,494,436 B2* | 7/2013 | Morgia | G06Q 10/10 434/350 |
| 8,539,027 B1* | 9/2013 | Chen | G06Q 50/01 709/202 |
| 8,539,359 B2 | 9/2013 | Rapaport et al. | |
| 8,666,961 B1* | 3/2014 | Qureshi | G06Q 10/10 707/705 |
| 8,762,302 B1 | 6/2014 | Mousavi et al. | |
| 8,775,431 B2 | 7/2014 | Jason | |
| 8,825,711 B2 | 9/2014 | Chan et al. | |
| 8,935,274 B1 | 1/2015 | Mihailovici et al. | |
| 8,983,924 B2 | 3/2015 | Portnoy et al. | |
| 9,009,126 B2 | 4/2015 | Spivack et al. | |
| 9,015,196 B2 | 4/2015 | Hua et al. | |
| 9,177,346 B2 | 11/2015 | Ahrens et al. | |
| 9,466,049 B2* | 10/2016 | DeHaan | G06Q 10/10 |
| 2002/0049786 A1* | 4/2002 | Bibliowicz | G06F 3/0481 715/211 |
| 2002/0142278 A1* | 10/2002 | Whitehurst | G09B 7/04 434/350 |
| 2003/0014491 A1* | 1/2003 | Horvitz | G06Q 10/109 709/206 |
| 2003/0233242 A1* | 12/2003 | Wenger | G06Q 10/10 705/328 |
| 2004/0002885 A1* | 1/2004 | Levy | G06Q 10/109 705/50 |
| 2004/0111467 A1* | 6/2004 | Willis | G06Q 10/10 709/203 |
| 2005/0228762 A1* | 10/2005 | D'Elena | G06Q 10/10 706/1 |
| 2006/0015393 A1* | 1/2006 | Eisma | G06Q 10/06 705/7.14 |
| 2006/0188860 A1* | 8/2006 | Morrison | G09B 7/00 434/322 |
| 2008/0052377 A1* | 2/2008 | Light | G06Q 10/107 709/218 |
| 2008/0178302 A1* | 7/2008 | Brock | H04L 63/0263 726/32 |
| 2008/0244418 A1* | 10/2008 | Manolescu | G06Q 10/00 715/753 |
| 2009/0240516 A1* | 9/2009 | Palestrant | G06Q 10/10 705/346 |
| 2010/0070448 A1 | 3/2010 | Omoigui | |
| 2012/0102050 A1 | 4/2012 | Button et al. | |
| 2012/0190386 A1* | 7/2012 | Anderson | G01C 15/04 455/456.3 |
| 2012/0296991 A1 | 11/2012 | Spivack et al. | |
| 2013/0007009 A1 | 1/2013 | Caldwell et al. | |
| 2013/0171594 A1* | 7/2013 | Gorman | G09B 5/00 434/219 |
| 2013/0275135 A1* | 10/2013 | Morales | G10L 15/065 704/236 |
| 2013/0275884 A1* | 10/2013 | Katragadda | H04L 65/403 715/753 |
| 2013/0304818 A1 | 11/2013 | Brumleve et al. | |
| 2014/0101085 A1* | 4/2014 | Lu | G06N 5/02 706/46 |
| 2014/0188538 A1* | 7/2014 | Dasgupta | G06Q 10/063112 705/7.14 |
| 2014/0201173 A1 | 7/2014 | Roth et al. | |
| 2015/0032813 A1 | 1/2015 | Doshi | |

OTHER PUBLICATIONS

John, Ajita, "Collaborative tagging and expertise in the enterprise." Collab. Web Tagging Workshop in conj. with WWW2006. 2006., 2006.

McDonald, David W. et al., "Expertise recommender: a flexible recommendation system and architecture." Proceedings of the 2000 ACM conference on Computer supported cooperative work. ACM, 2000., 2000.

* cited by examiner

200

300

600

800

METHOD AND SYSTEM FOR PROVIDING EXPERTISE COLLABORATION

FIELD OF THE DISCLOSURE

The subject disclosure relates to a method and system for providing expertise collaboration.

BACKGROUND

In organizations, it can be difficult to find people and projects, as well as to get updated information about them. This can be particularly true for new employees in large organizations. There is often much data generated within an organization about employees and their projects. However, it can be difficult and time consuming to keep the information together. This can be further complicated by the number of different ways in which individuals communicate, as well as the various platforms available for working on projects.

BRIEF DESCRIPTION OF THE DRAWINGS

Reference will now be made to the accompanying drawings, which are not necessarily drawn to scale, and wherein.

DETAILED DESCRIPTION

Figure 1:
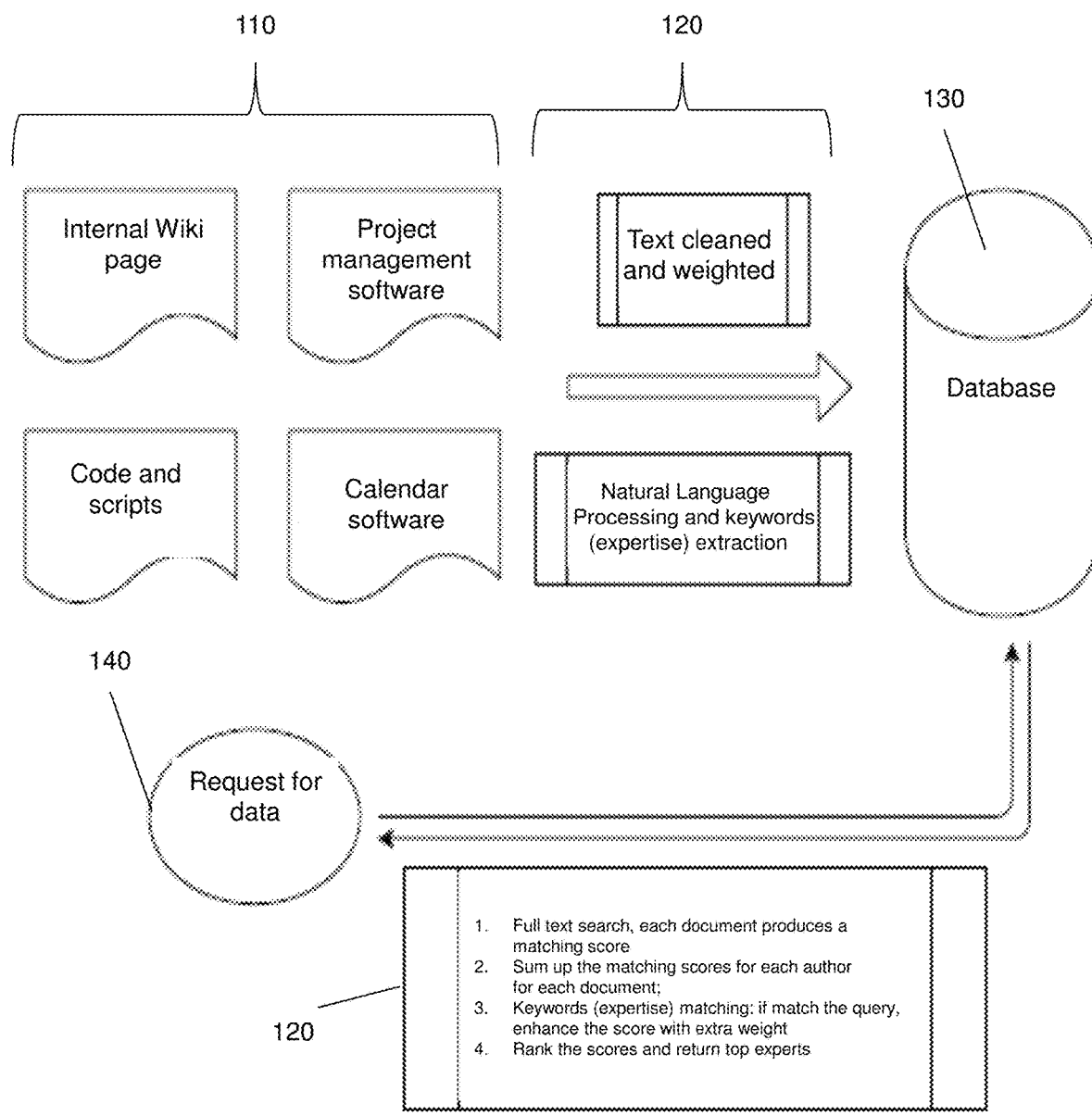
FIG. 1 depicts an illustrative embodiment of a system that manages expertise collaboration including sharing of information.

The subject disclosure describes, among other things, illustrative embodiments for management of information which enables collaboration between users. The information can be various types of information which is evaluated, such as based on originality, expertise, quality, and so forth. Other users can then gain access via a management system that is monitoring the information. Other embodiments are described in the subject disclosure.

One or more aspects of the subject disclosure can be a method that includes monitoring, by a system including a processor, for storage of information via a first computing device of an entity as stored information in a memory accessible to the first computing device, where the information is generated via a user interface of the first computing device, and where the information is non-public information of the entity. The method can include determining, by the system, a subset of the information that satisfies an originality threshold; and determining, by the system, whether the subset of the information satisfies a shareability criterion. The method can include, responsive to a determination that the subset of the information satisfies the shareability criterion, generating, by the system, metadata that includes a first identification of a first user associated with generating the subset of the information via the user interface of the first computing device and a second identification of a topic of the subset of the information. The method can include storing, by the system, the metadata in a database with a group of other metadata that identifies topics and users associated with other information. The method can include receiving, by the system from a second computing device of the entity, a request for data. The method can include comparing, by the system, the data to the topics in the database according to a comparison criterion; and, responsive to a match between the data and the topic of information, providing, by the system, the second computing device with access to the first identification of the first user and to the stored information.

One or more aspects of the subject disclosure include a device having a user interface; a processor; and a memory that stores executable instructions that, when executed by the processor, facilitate performance of operations, including generating information via the user interface. The processor can store the information in the memory as stored information, where the storing of the information enables a system to generate metadata responsive to a determination by the system that the information satisfies an originality threshold and a shareability criterion, where the metadata includes a first identification of a first user associated with the information and a second identification of a topic of the information, and where the metadata is stored in a database with a group of other metadata that identifies topics and users associated with other information. The processor can provide a second computing device with access to the stored information in the memory responsive to a first determination by the system of a match between a request for data from the second computing device and the topic of information. The processor can receive a communication from the second computing device, where the communication causes the system to adjust the metadata to indicate that a first user of the device and a second user of the second computing device are collaborating users responsive to a second determination by the system that the communication is associated with the stored information.

One or more aspects of the subject disclosure include a machine-readable storage medium, comprising executable instructions that, when executed by a processor of a second computing device of a second user, facilitate performance of operations, including generating a request for data. The processor can provide the request for data to a system to enable the system to compare the data to metadata including topics of information stored in a database according to a comparison threshold, where the topics of information correspond to a plurality of information that the system has determined satisfies an originality threshold and a shareability criterion. The processor can receive relevancy scores associated with a subset of the topics of information that were determined by the system based on the comparing; and can provide a selection of a topic of information selected from among the subset of the topics of information to the system. The processor can, responsive to the selection, receive an identification of a first user that generated information corresponding to the topic of information and obtaining access to the information.

FIG. 1 depicts an illustrative embodiment of a system 100 that enables management of information. System 100 provides for analysis of stored information, such as via machine learning, natural language processing and text mining, to identify skills and expertise, find relevant projects, and/or connect people and projects intelligently. In one embodiment, system 100 can avoid non-comparable skill sets from person-to-person (because everyone has different perception of their skills), and can instead generate skills and expertise at different granularity using machine learning on organizational data that contains people and projects information. In one embodiment, system 100 allows for the use of a more granular analysis of expertise to identify the right person(s) to solve a very specific problem. In one embodiment, demonstrated skills, which are mined from various sources including employee's activities and logs within an organization, are utilized instead of, or in addition to, self-declared skills. In another embodiment, system 100 provides for calculating project relevance scores, to help people to find relevant projects and results that have already be done in the organization, and thus reduce duplicated efforts.

In one embodiment, the information being generated and stored in system 100 can be various types of information including text, graphics, images, video, computer code, scripts, voice, video and other types of data that can be stored in a computer memory. The information can be generated at a particular device, such as via typing a document at a user interface of the device. In another embodiment, the information can be generated by adjusting already existing information, such as inserting objects into an image or adding experimental results to a spreadsheet. In yet another embodiment, the information can be generated by being downloaded, in whole or in part, from another source. Generation of the information can be at a single computing device or can be at multiple devices, such as in a collaborating work environment where multiple devices can edit information, such as a document. In one embodiment, the stored information can be non-public information, such that access to the information is limited (e.g., limited to devices within or associated with an entity; limited to devices obtaining authorization from the entity to access the information; and so forth).

The information can be monitored from various sources 110, including collaborative code and script platforms, wiki pages (e.g., documenting projects and results), platforms for proposing ideas within an organization or entity, project management platforms (e.g., Rally) which track projects and update their status, calendar programs, and project benefit analysis software (e.g., Amplify) that enables reporting accomplished projects and acquired new skills. In another embodiment, the information can include communications such as emails, instant messaging and so forth.

In one embodiment, a server(s) 120 can monitor for storage of information (e.g., via a first computing device of an entity where the stored information is in a memory accessible to the first computing device); can determine or otherwise identify a subset of that information that satisfies an originality (or newness) threshold; and can determine whether the subset of the information satisfies a shareability criterion. As an example, the originality threshold can be utilized to distinguish between a document or other information that has been revised as to format or error correction as opposed to a document that has been revised as to substance. In one embodiment, the originality threshold can be based on a percentage of the stored information (e.g., a document) that has been revised. In another embodiment, the originality threshold can be based on detecting portions of information that were not previously present. In another embodiment, the technique utilized for revising the information can be considered in the originality threshold such as determining that several lines of code were inserted into a computer program which would satisfy the originality threshold as compared to several lines of text that are not part of the code being inserted therein which would not satisfy the originality threshold.

In one embodiment, the server 120 can apply one or more shareability criterion to determine whether the particular information should be identified as shareable information (or otherwise made available to other users). In one embodiment, the shareability criterion can be based on a determined subject matter of the information. For example, the stored information can be computer code dealing with operation of an entity's product. In this example, the server 120 can determine that the code is associated with product operation (e.g., based on keyword analysis of the code, a project title corresponding to the code, and so forth) in which case the computer code would satisfy the shareability threshold. In another example, the server 120 can maintain a list of subject matters that are considered to be shareable and can perform an analysis (natural language and/or keyword analysis) of the stored information to determine whether it falls within one of the shareable subject matters. The shareability criterion may or may not be based on confidentiality. The shareability criterion may also include a determination as to whether the information is of a type that is considered valuable to other users in the entity, including whether the information can be applicable to other projects by other users in the entity, such as a determination that discovery of a new coating for one product may be applicable to other products.

In another embodiment, the shareability criterion can be based on factors that are outside of the information. For example, a particular division (e.g., R&D) of an entity may have all of its information designated as shareable and another division (Finance) may have none of its information designated as shareable. In another example, the shareability criterion may be based on the particular author(s) of the information. For instance, a user may be designated as a prolific developer due to the amount of information that he or she has shared with other users and based on the status as prolific, all information originated by that prolific user may be designated as shareable. In one embodiment, the determination as to whether information satisfies the shareability criterion can be performed by server 120 without user interaction (e.g., the server 120 makes the determination without receiving user input influencing the determination). In another embodiment, the determination as to whether information satisfies the shareability criterion can be performed by server 120 according to some user interaction, such as the author of information flagging that particular information as shareable. In one embodiment, the determination as to whether information satisfies the shareability criterion can be done based on multiple criteria. For example, information can be determined to be shareable where the information has been flagged by the author as shareable, where the information has not been flagged by an administrator as restricted, and where the information contains subject matter that matches subject matter designated by the entity as being shareable.

In one embodiment, server 120 can generate particular metadata for the stored information (or a portion thereof) responsive to a determination that the information satisfies the originality threshold and the shareability criterion. For example, the metadata can include an identification of a user associated with generating the information and/or an identification of a topic of the information. In one embodiment, the server 120 can store metadata in a database 130 with other metadata that identifies topics and users associated with other information. In another embodiment, the server 120 can receive a request for data (e.g., from another computing device 140 of the entity) and can compare the requested data to the topics in the database 130 according to a comparison criterion. For example, the comparison criterion can be keyword matches in the request and in the metadata topic. Responsive to a match between the data and the topic of information, the server 120 can provide the other computing device 140 with access to the identification of the user and/or to the stored information.

In one embodiment, the server 120, responsive to the other computing device 140 accessing the stored information, can adjust the metadata to indicate that the user is a consumed user (e.g., indicate that the user has generated information that has been accessed by one or more other users). In one embodiment, the level of consumption can also be indicated. For example, server 120 can monitor an amount of time that other users have accessed the stored information to determine whether the consumption was cursory or was involved.

In one embodiment, the server 120, responsive to the other computing device 140 accessing the stored information, can adjust the metadata to indicate that a second user of the other computing device 140 is a learned user (e.g., indicate that the second user has accessed stored information that has been generated by another user). In one embodiment, the level of being learned can also be indicated. For example, server 120 can monitor an amount of time that the second user has accessed the stored information (or other stored information of other users).

In one embodiment, the server 120 can monitor for communications between computing devices; responsive to detecting the communications, determine whether the communications are associated with the stored information; and responsive to the communications being associated with the stored information, adjust the metadata to indicate that the users of the computing devices are collaborating users.

In one embodiment, the server 120 can determine relevancy scores during a search of the metadata in the database 130. These relevancy scores (or a portion thereof) can be provided for presentation by the other computing device 140 that has made a data request. Relevancy scores can be determined based on various factors and techniques, including one or more of parsing requests for data, weighting terms taken from the requests (or derived therefrom), and so forth. For example, the server 120 can determine a keyword from a group of words in the request for data; determine whether the keyword is included in descriptions of the topics of the other information stored in the database 130; and, responsive to a determination that the keyword is included in a particular description, increase the relevancy score corresponding to information associated with that description. In one embodiment, monitoring for the storage of the information can include monitoring sharing of computer code between multiple end user devices of the entity. In one embodiment, monitoring for the storage of the information can include monitoring emails and messaging between multiple end user devices of the entity.

In one or more embodiments, the server 120 can monitor sharing of information and can designate users as consumed users (source of the shared information) or learned users (recipient of the shared information). The extent of the sharing can also be monitored, such as determining cursory reviews of information as opposed to extensive reviews of the information. In one embodiment, the server 120 can determine when a learned user adopts some or all of the shared information. For example, the server 120 can determine when a learned user (who has accessed stored information from another user) has adjusted his or her own information based on the accessed information. In this example, further indication can be provided to designate the consumed user as having been the source of adjustment for another user. In one embodiment, various users can access the server 120 to identify consumed and/or learned users (and/or the extent of sharing amongst these users).

In system 100, server 120 can be a single device that performs the management of the information or can be multiple devices performing the management. In one embodiment, multiple servers 120 can be tasked with various steps to be performed in the management of the information, such as a first server that monitor for information being stored, a second server that applies the originality threshold and the shareability criterion to detected information, and a third server that generates metadata according to information that has satisfied the originality threshold and the shareability criterion. Other configurations of servers can also be utilized to perform the information management described in the exemplary embodiments.

Figure 2:
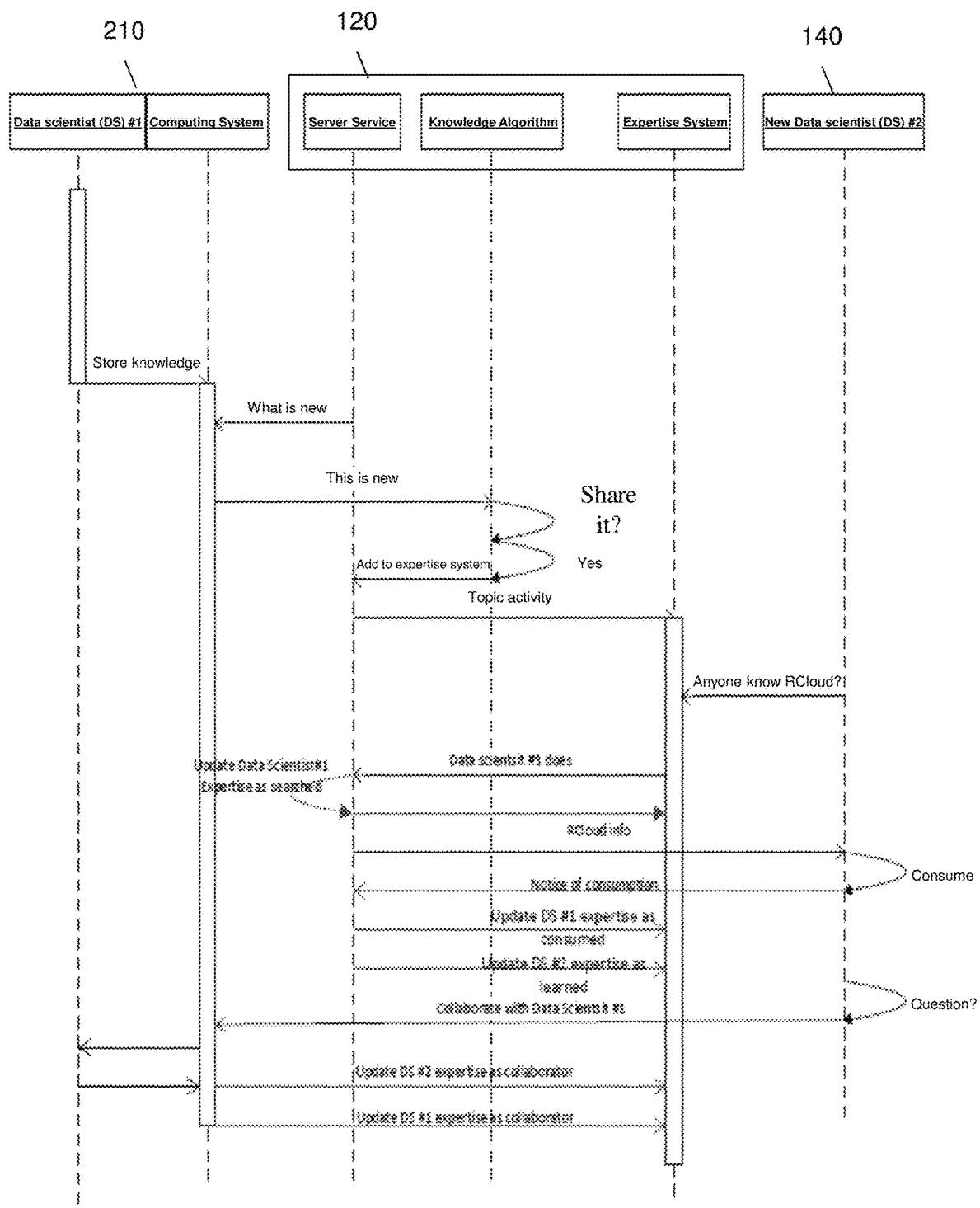
FIG. 2 depicts an illustrative embodiment of a data flow that can be used with the system of FIG. 1.

FIG. 2 depicts an illustrative embodiment of a data flow 200 that can be utilized in system 100. In one embodiment, a first computing device 210 can generate information, such as via a user interface. The information can then be stored in a memory (e.g., a local memory of the first computing device or a remote memory). The server 120 can determine whether the stored information satisfies an originality threshold (e.g., whether the stored information is new or substantively different from other stored information of that user) and a shareability criterion (e.g., whether it is desired by the entity and/or the particular user to share the stored information). In one embodiment, the information (or a portion thereof such as a portion that is determined to be new and shareable) can be copied and stored in a separate memory (e.g., an expertise system memory). In another embodiment, the information (or a portion thereof such as a portion that is determined to be new and shareable) can remain in the same memory where it was stored and a pointer to its location can be generated to facilitate access by other users from other devices.

The server 120 can generate metadata when it is determined that some or all of the information should be shared, such as based on satisfying the originality threshold and the shareability criterion. In one embodiment, the metadata can include a first identification of a first user associated with the stored information and/or a second identification of a topic of the information. For example, the generated metadata can be stored in database 130 with a group of other metadata that identifies topics and users associated with other information that has undergone this process. In one embodiment, the metadata can be stored in a device that is different from where the stored information is located. In one embodiment, the metadata can include a pointer to a location of the stored information in a memory of another device. In another embodiment, the metadata and the information (or a copy thereof) can be stored in a same device(s).

In one embodiment, the server 120 can receive a request for data from other users, such as the other computing device 140. As an example, the other user may be working on computer code for a product and desires to see how other users have collaborated on computer code utilizing a code collaboration platform, such as Rcloud. The other computing device 140 can send a request for data to the server 120 to determine if other users have utilized Rcloud. The server 120 can determine if there are any matches between the request for data and the topics of information stored in the database 120. The analysis can be based on various factors, including keyword matches between the data request and the topic of information. In one embodiment, the server 120 can provide or otherwise enable or facilitate access for the other computing device 140 to the stored information and/or to the user that generated the stored information responsive to a match between the data request and the topic of information. In one embodiment, the determination of a match between the data request and the topic of information in the metadata causes the server 120 to adjust the metadata to indicate that the first user of the first computing device 210 is a searched user.

In one embodiment, the server 120 can monitor communications to determine whether the first computing device 210 received a communication from the other computing device 140 where the communication is associated with the stored information. If such a communication occurred then server 120 can adjust the metadata to indicate that the first user of the first computing device 210 and a second user of the other computing device 140 are collaborating users. In one embodiment, the designation of collaborating users can be based on approval by one or both of the first and second users. In another embodiment, the designation as collaborating users can be based on an extent or the subject matter of the communications between the first and second users. For example, the server 120 can determine whether the stored information was adjusted (e.g., lines of code changed or added thereto, additional text added thereto, figures added or modified, additional data added thereto, and so forth) and further determine whether the adjustment to the stored information was associated with the communication between the first and second users. For instance, an email may be sent from the second user to the first user with revisions to text in the stored information. In another example, the communication between the first and second users can be a notification sent to the first computing device 210 that indicates that the second user of the other computing device 140 is accessing and changing code in the stored information. In this example, the stored information may be computer code or scripts in a collaborative platform that can be shared and modified by multiple users (e.g., pursuant to review and authorization by the multiple parties).

In one embodiment, the metadata can be adjusted to indicate that the first user is a consumed user responsive to the other computing device 140 accessing the stored information. In one embodiment, the metadata can be adjusted to indicate that the second user of the other device 140 can be a learned user responsive to the other computing device accessing the stored information. In one embodiment, access to the stored information is limited to end user devices associated with the entity and/or pursuant to authorization of an administrator of the entity.

Figure 3:
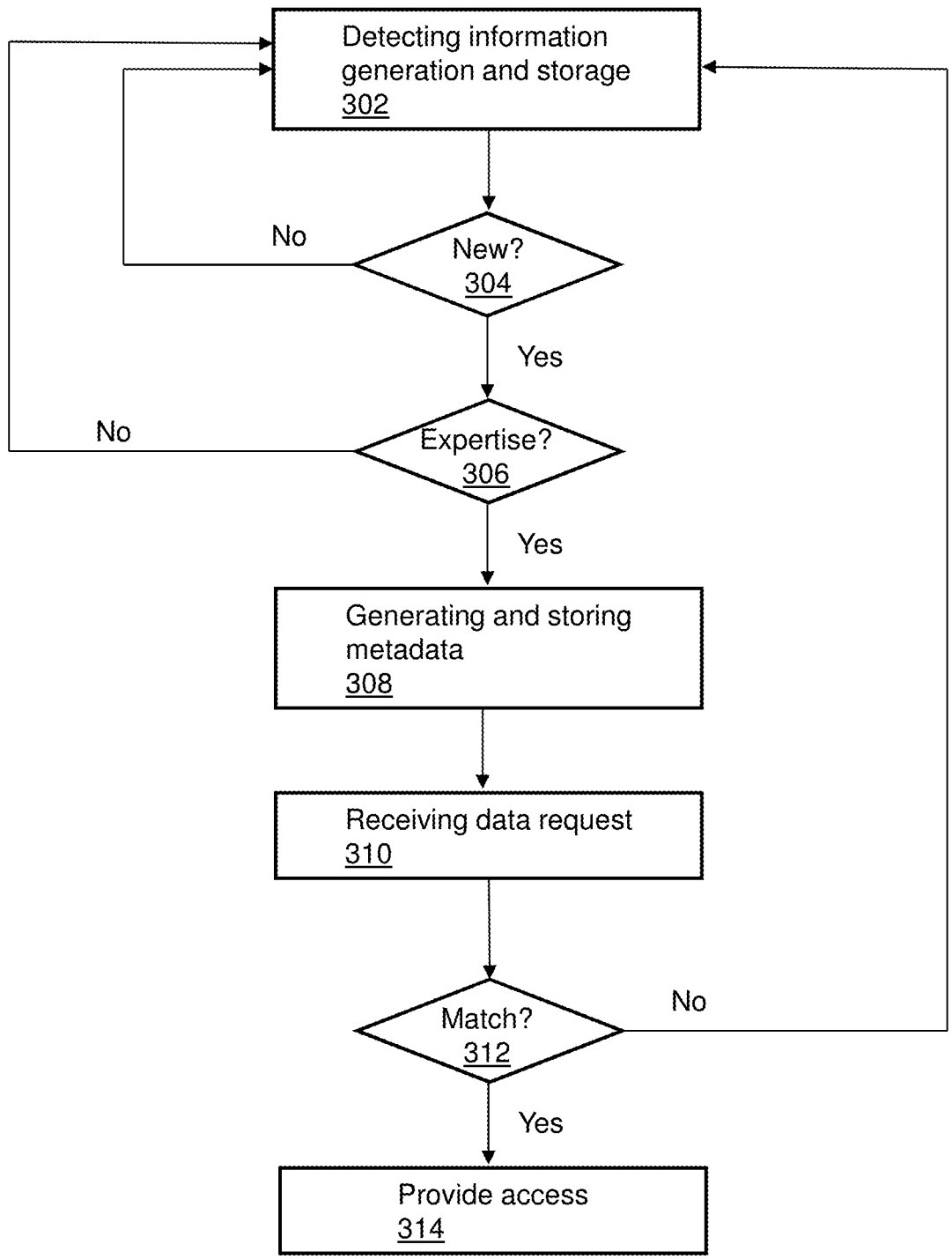
FIG. 3 depicts an illustrative embodiment of a method used in portions of the system described in FIG. 1.

FIG. 3 depicts an illustrative embodiment of a method 300 used by system 100 for managing information. One or more of the steps of method 300 can be performed by the server 120 or another device(s). At 302, a determination can be made as to whether information has been generated and/or stored in an accessible memory. For example, the information can be generated via a user interface of the first computing device 210, and the information can be non-public information of the entity. At 304, the server 120 can determine whether the stored information is new information, such as by determining whether a subset of the information satisfies an originality threshold.

At 306, the server 120 can determine whether the stored information should be shared with other users, such as by determining whether the subset of the information satisfies a shareability criterion. Responsive to a determination that the subset of the information satisfies the shareability criterion, at 308 the server 120 can generate metadata that facilitates searching and accessing the stored information. For instance, the metadata can include a first identification of a first user associated with generating the subset of the information and a second identification of a topic of the subset of the information. At 308, the server 120 can store the metadata in the database 130 with a group of other metadata that identifies topics and users associated with other information.

At 310, the server 120 can receive a request for data from another computing device (e.g., device 210) of the entity. At 312, the server 120 can analyze the data request and compare it to the metadata in the database 130 (e.g., analyze for a correlation between the data request and the topics of information according to a comparison criterion). Responsive to a match between the requested data and the topic of information, the server 120 at 314 can provide the other computing device 140 with access to the first identification of the first user and/or to the stored information.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

One or more of the exemplary embodiments can provide for multiple forms of media services being offered to media devices over landline technologies. Additionally, media services can be offered to media devices by way of a wireless access base station operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure. Further, an IP Multimedia Subsystem (IMS) network architecture can be facilitates to combine services of circuit-switched and packet-switched systems.

Figure 4:
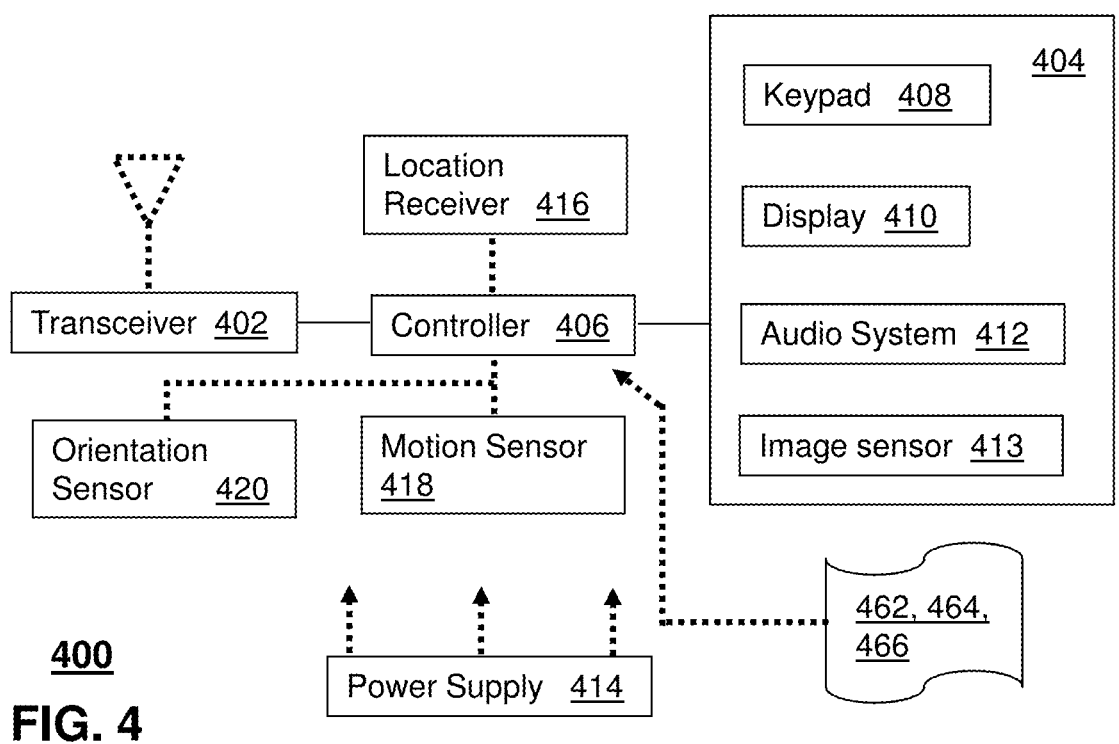
FIG. 4 depicts an illustrative embodiment of a communication device that can be used in the system of FIG. 1.

FIG. 4 depicts an illustrative embodiment of a communication device 400. Communication device 400 can serve in whole or in part as an illustrative embodiment of the devices depicted in FIGS. 1 and/or 2, and can be configured to perform portions of method 300 of FIG. 3.

As an example, device 400 can generate a request for data; provide the request for data to a system to enable the system to compare the data to metadata including topics of information stored in a database according to a comparison threshold, where the topics of information correspond to a plurality of information that the system has determined satisfies an originality threshold and a shareability criterion; receive relevancy scores associated with a subset of the topics of information that were determined by the system based on the comparing; provide a selection of a topic of information selected from among the subset of the topics of information to the system; and/or responsive to the selection, receive an identification of a first user that generated information corresponding to the topic of information and obtaining access to the information. In one embodiment, the relevancy scores can be determined by: determining a keyword from a group of words in the request for data; determining whether the keyword is included in descriptions of the topics of the information stored in the database; and responsive to a determination that the keyword is included in a first description, increasing the relevancy score corresponding to first information associated with the first description. In another embodiment, the device 400 can transmit a communication from the second computing device to a first communication device of the first user that generated the information, wherein the communication causes the system to adjust the metadata to indicate that the first and second users are collaborating users responsive to a determination by the system that the communication is associated with the stored information. In one embodiment, the metadata can be adjusted to indicate that the first user is a consumed user responsive to the second computing device accessing the stored information. In one embodiment, the metadata can be adjusted to indicate that the second user is a learned user responsive to the second computing device accessing the stored information. In one embodiment, the second computing device can be associated with an entity, and the access to the stored information can be limited to end user devices associated with the entity.

Communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth®. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned, for example, below a small hole in a housing assembly of the communication device 400 to force the communication device 400 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 400 as described herein can operate with more or less of the circuit components shown in FIG. 4. These variant embodiments can be used in one or more embodiments of the subject disclosure.

The communication device 400 can be adapted to perform the functions of the devices of FIGS. 1 and/or 2. It will be appreciated that the communication device 400 can also represent other devices that can operate in systems of FIGS. 1 and/or 2. In addition, the controller 406 can be adapted in various embodiments to perform the functions 462, 464, 466, respectively. Function 462 can include monitoring for storage of information via a first computing device of an entity as stored information in a memory accessible to the first computing device, where the information is generated via a user interface of the first computing device, and where the information is non-public information of the entity; determining a subset of the information that satisfies an originality threshold; determining whether the subset of the information satisfies a shareability criterion; responsive to a determination that the subset of the information satisfies the shareability criterion, generating metadata that includes a first identification of a first user associated with generating the subset of the information via the user interface of the first computing device and a second identification of a topic of the subset of the information; storing the metadata in a database with a group of other metadata that identifies topics and users associated with other information; receiving, from a second computing device of the entity, a request for data; comparing the data to the topics in the database according to a comparison criterion; and responsive to a match between the data and the topic of information, providing the second computing device with access to the first identification of the first user and to the stored information. Functions 464 can include generating information via the user interface; storing the information in the memory as stored information, where the storing of the information enables a system to generate metadata responsive to a determination by the system that the information satisfies an originality threshold and a shareability criterion, where the metadata includes a first identification of a first user associated with the information and a second identification of a topic of the information, and where the metadata is stored in a database with a group of other metadata that identifies topics and users associated with other information; providing a second computing device with access to the stored information in the memory responsive to a first determination by the system of a match between a request for data from the second computing device and the topic of information; and receiving a communication from the second computing device, where the communication causes the system to adjust the metadata to indicate that a first user of the device and a second user of the second computing device are collaborating users responsive to a second determination by the system that the communication is associated with the stored information. Function 466 can include generating a request for data; providing the request for data to a system to enable the system to compare the data to metadata including topics of information stored in a database according to a comparison threshold, where the topics of information correspond to a plurality of information that the system has determined satisfies an originality threshold and a shareability criterion; receiving relevancy scores associated with a subset of the topics of information that were determined by the system based on the comparing; providing a selection of a topic of information selected from among the subset of the topics of information to the system; and responsive to the selection, receiving an identification of a first user that generated information corresponding to the topic of information and obtaining access to the information.

Upon reviewing the aforementioned embodiments, it would be evident to an artisan with ordinary skill in the art that said embodiments can be modified, reduced, or enhanced without departing from the scope of the claims described below. For example, a user can log in to a GUI and see connections between users (e.g., consumed, learned, search) and gain access to the corresponding information. In one embodiment, the GUI can enable posting of communications between the users that can be seen by other users and/or can be directed to only the specific user. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 5:
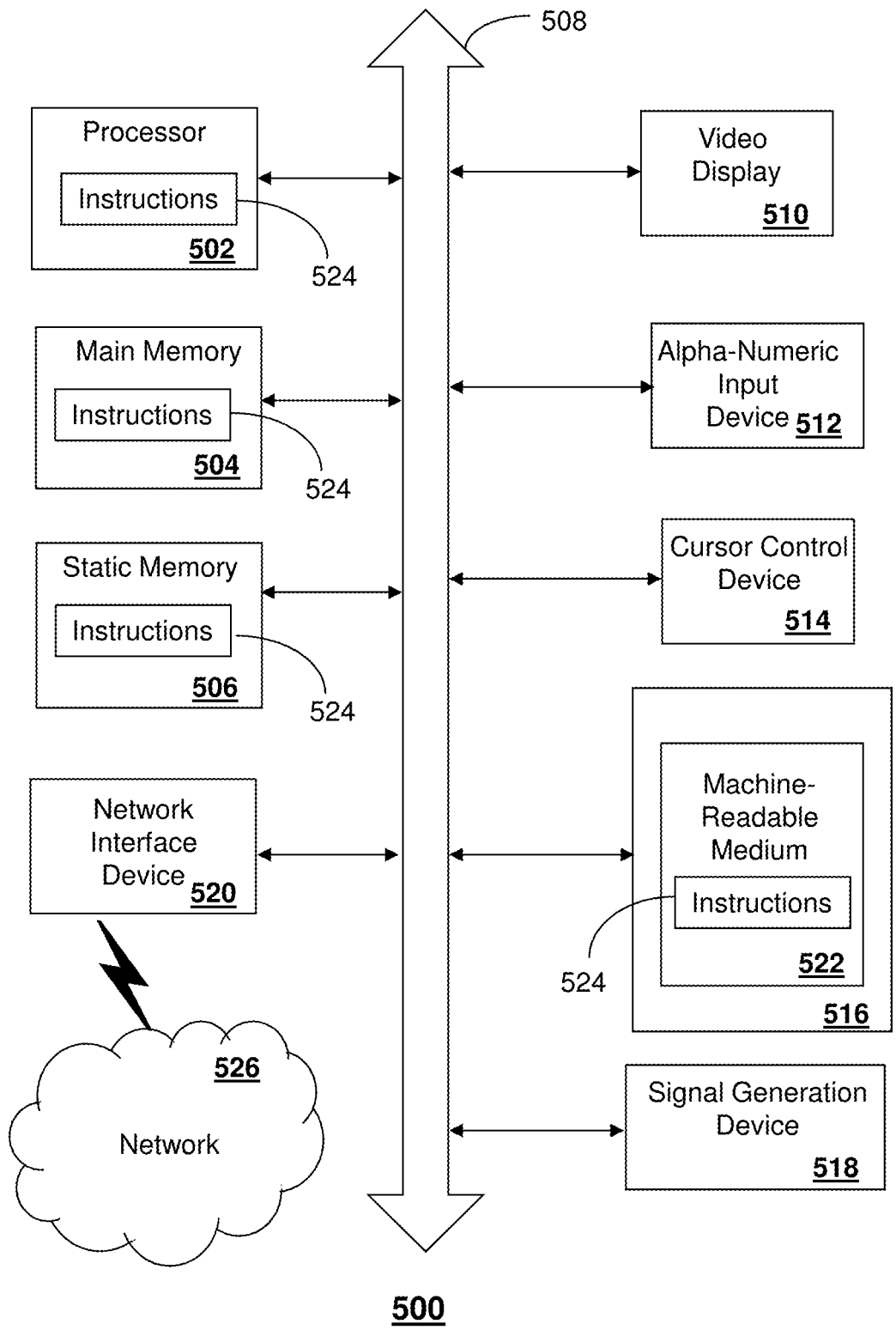
FIG. 5 is a diagrammatic representation of a machine in the form of a computer system within which a set of instructions, when executed, may cause the machine to perform any one or more of the methods described herein.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as the server 120, which can manage information and the access to that information, such as within an organization or entity. For instance, a first data scientist can work inside a first distributed system which stores information on a computing system that is generated from the first data scientist's work. An expertise server service can monitor and evaluate the information to identify particular information that is new and useful information. The new information can be provided to an algorithm to determine if it satisfies particular criteria (e.g., pioneering information vs. derivative information, etc.). Topic activity can be sent to a service that stores metadata about the activity as a type of expertise. When a second data scientist asks the expertise system if there is any metadata on a topic, the expertise system can return the corresponding metadata, links to files, and/or links to an originating author (e.g., first data scientist). The second data scientist can then decide if the particular information is desirable and/or can further communicate back with the first data scientist based upon the connection made with the expertise system. The expertise system can also calculate project relevance scores, to help people to find relevant projects and results that have already be done in the organization, and thus reduce duplicated efforts.

In some embodiments, the machine may be connected (e.g., using a network 526) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU)), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display). The computer system 500 may include an input device 512 (e.g., a keyboard), a cursor control device 514 (e.g., a mouse), a disk drive unit 516, a signal generation device 518 (e.g., a speaker or remote control) and a network interface device 520. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

One or more of the exemplary embodiments can effectively answer, without having to send multiple emails and go through layers of managers, questions such as: who are the data engineers working with ingesting similar dataset; who are the data scientists working on social network and churn prediction; are there existing projects efforts on demographic prediction somewhere else in the company; how do I find the best frontend engineer to collaborate to build an application, etc.

In one embodiment, a number of data products can automatically feed themselves using the machine learnt and recommended results from natural language processing and text mining based on the various sources of existing data in our organization. In this embodiment, data sources can include but not limited to: wiki pages, codecloud, Rcloud notebooks, Rally user stories, resume and yearly review in Amplify.

Figure 6:
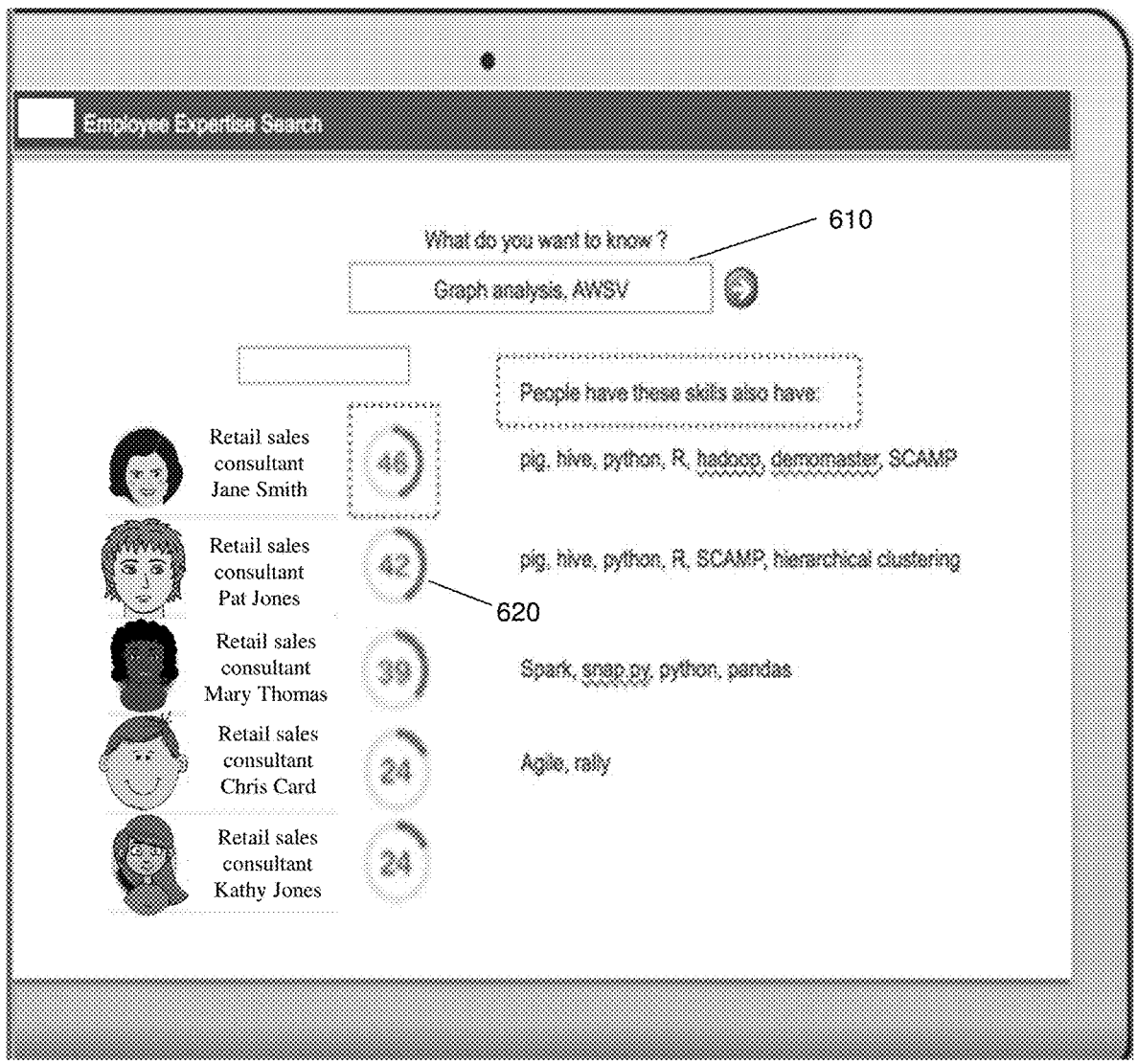
FIGS. 6-9 depict an illustrative embodiment of Graphical User Interfaces for a system that manages expertise collaboration including sharing of information.

In one embodiment illustrated in GUI 600 of FIG. 6, an expertise search enables you to find and connect to the right person. Type in the search box 610 what expertise you are looking for, you will get a list of people who have this expertise with a matching score 620 for each person. It also shows what other expertise each person has, so that you have an idea what type of work he/she does. You can search for both high level and low level detailed skills. For example, data science can be a high level skill, and knowledge of SCAMP dataset can be a low level skill. In general, the lower the level the skill is, the more useful it can be for locating the experts. Skills can be both declared and obtained from text mining from different sources. Demonstrated skills (obtained from the projects you have worked on) can be weighted more than declared skills. Skills also decay as time goes by.

Figure 7:
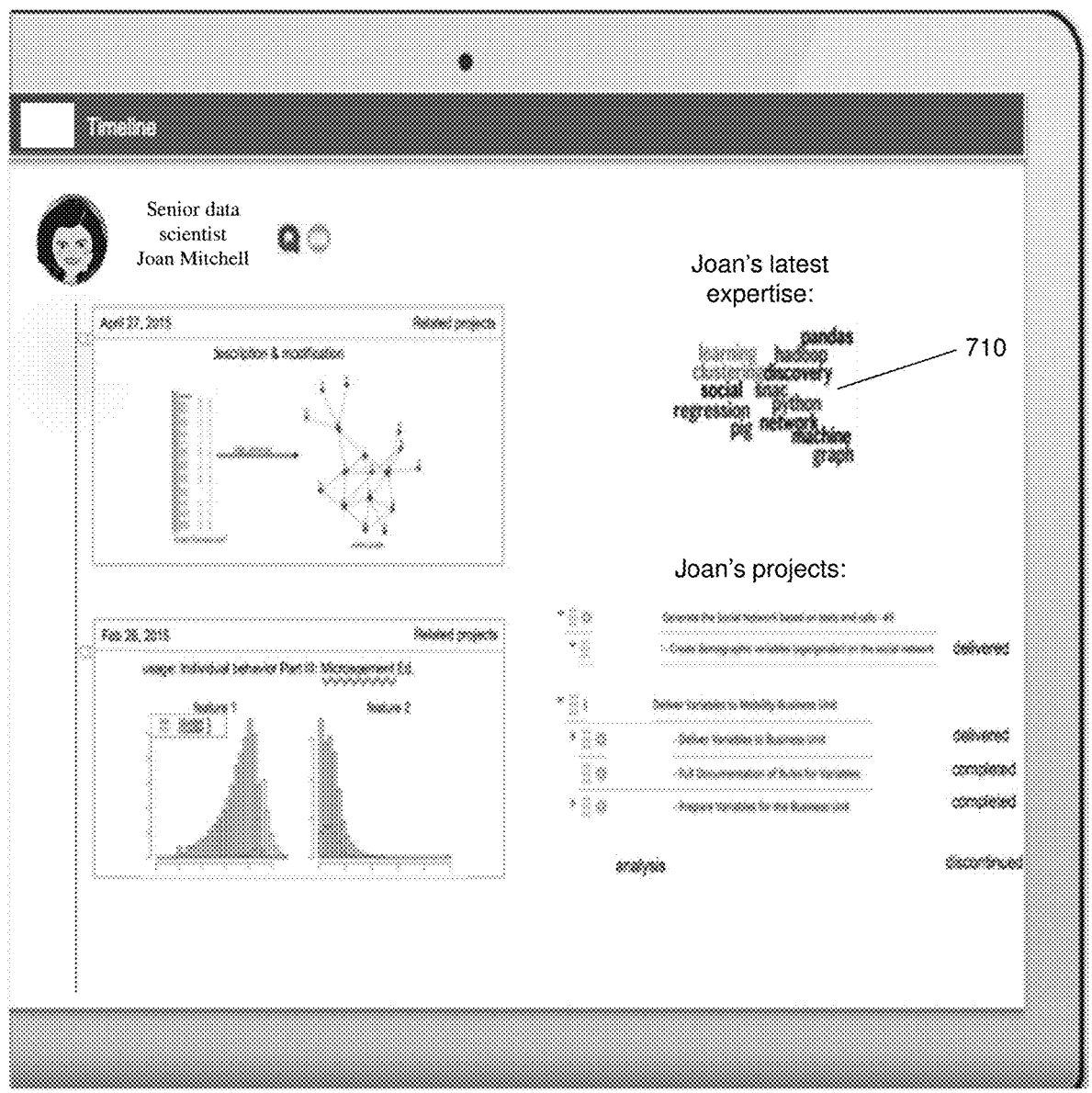

In one embodiment in GUI 700 of FIG. 7, a timeline enables a user to view people's projects in a concise and timely way. At the Expertise Search page 600, if you are interested in a particular person, you can click on the person, and it goes to his/her Timeline 700. As shown below, on the left side, Timeline exhibits this person's wiki pages ordered by time using snippets and you can continuously scroll down to view more snippets. On the lower right side in the Rally, projects participated in by a user are displayed and their status (whether its delivered, or discontinued, etc.) are included. The skills 710 related to this person are summarized as well.

Figure 8:
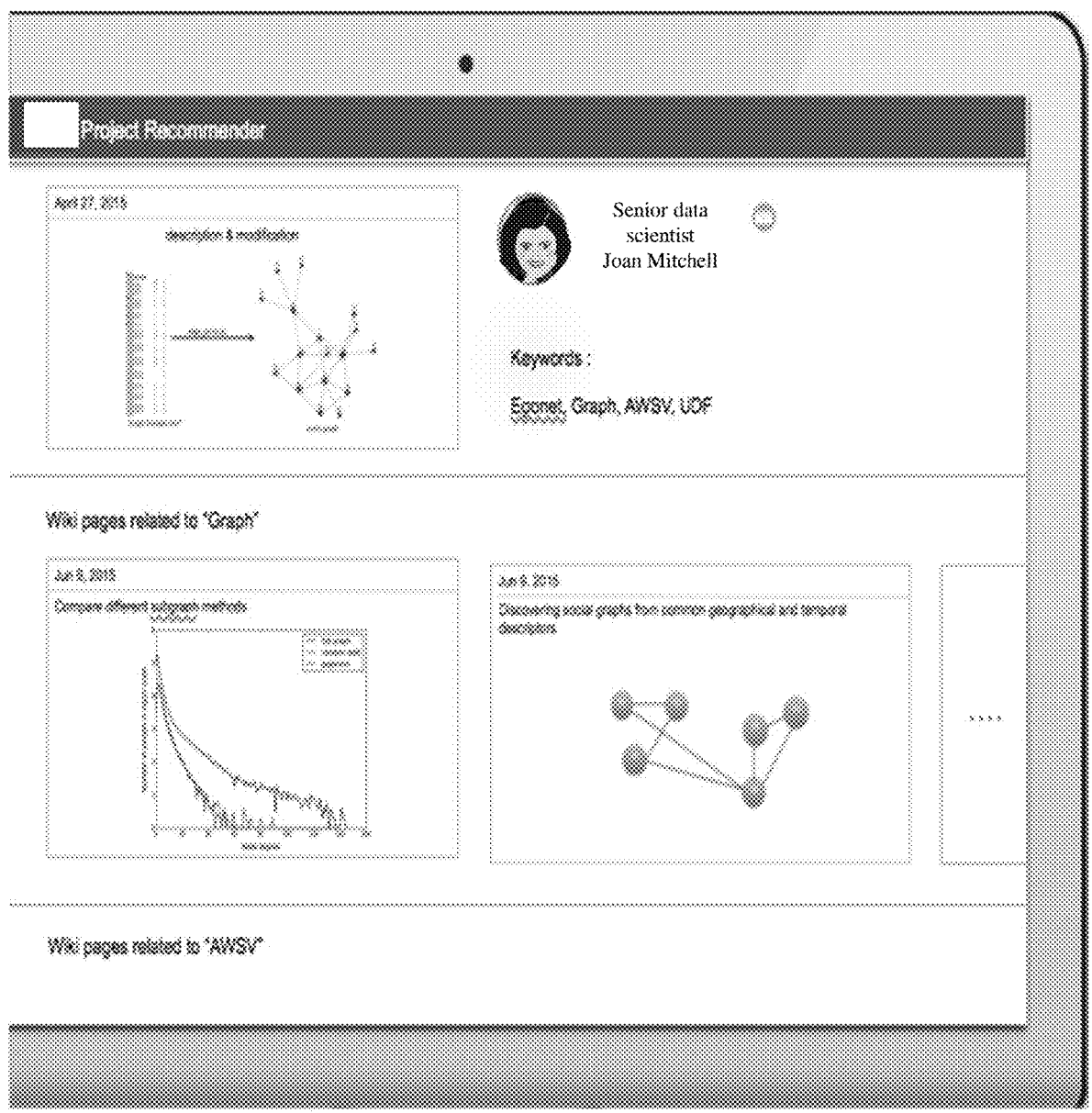

In one embodiment in GUI 800 of FIG. 8, Project Recommender enables you to discover new and related projects. At the Timeline page 700, if you are further interested in a particular project, you can click on "related projects", and it leads you to Project Recommender page 800. The project you are interested in is summarized by a few keywords. For each keyword, it automatically recommends projects related to that keyword. You can scroll to the right to find more related projects to a particular keyword. You can also scroll down to view more projects related to other keywords.

Figure 9:
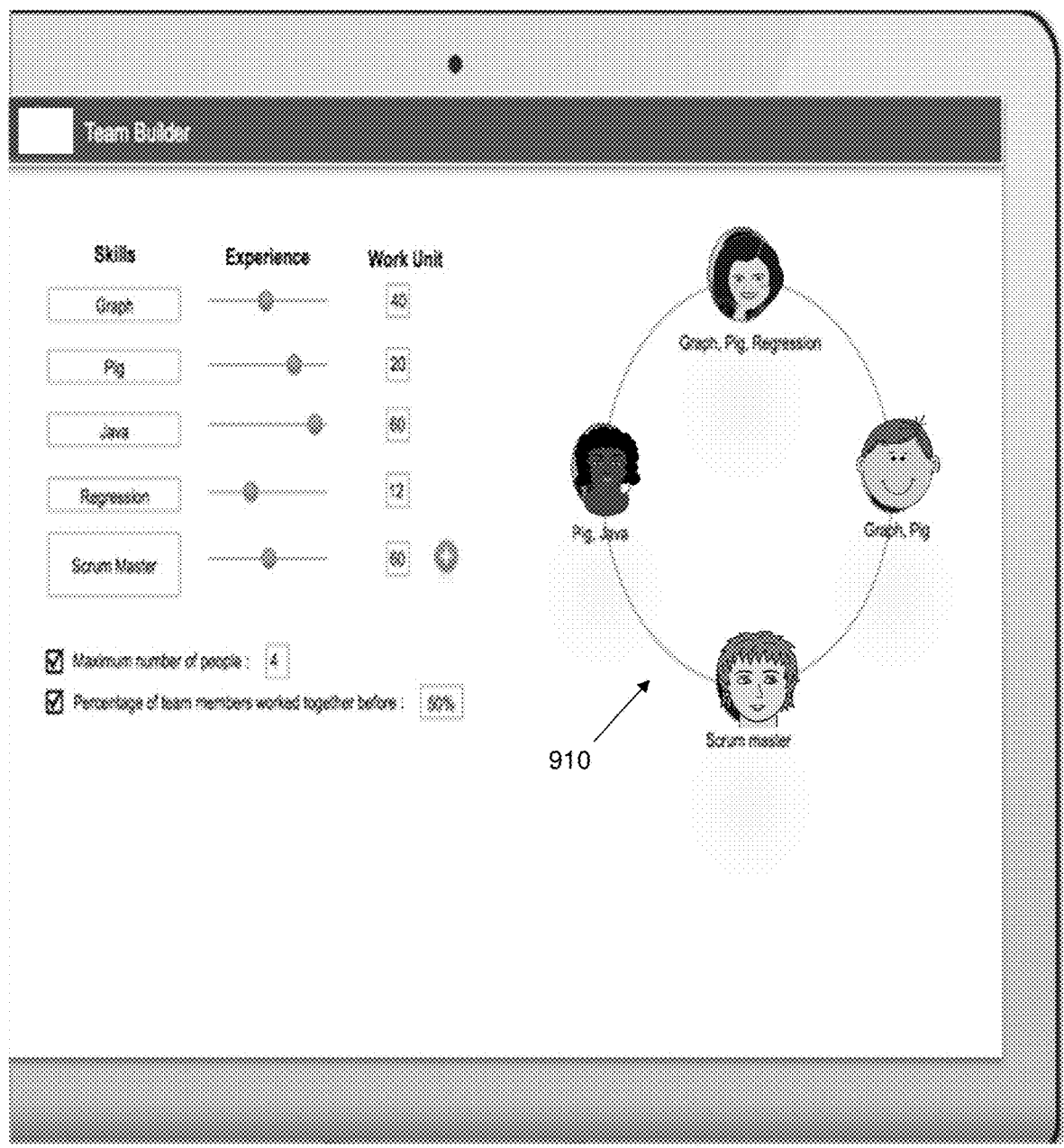

In one embodiment in GUI 900 of FIG. 9, Team Builder enables you to build a starting team 910 based on the expertise you are looking for and constraints you would like to impose. If you have a project in mind, and you would like to build a team, you can input the skills and level of expertise you desire, and required number of hours to work on the project. In addition, you can also add certain constraints such as maximum number of people, and the percentage of people who had previously worked together. This will result in display of the recommended team 910 as your starting point, which can include identification information, icons representing those members, links to their email addresses, links to sample work from those members, and so forth. One or more of the exemplary embodiments, can use existing data without the need to generate new data (no new descriptive data for the users); data collection can be mainly done by scrapping and is relatively straightforward, data can be stored locally and no need to request big data storage. Other data with respect to users can also be accessed and analyzed, including resumes, performance reviews, and so forth.

Figure 10:
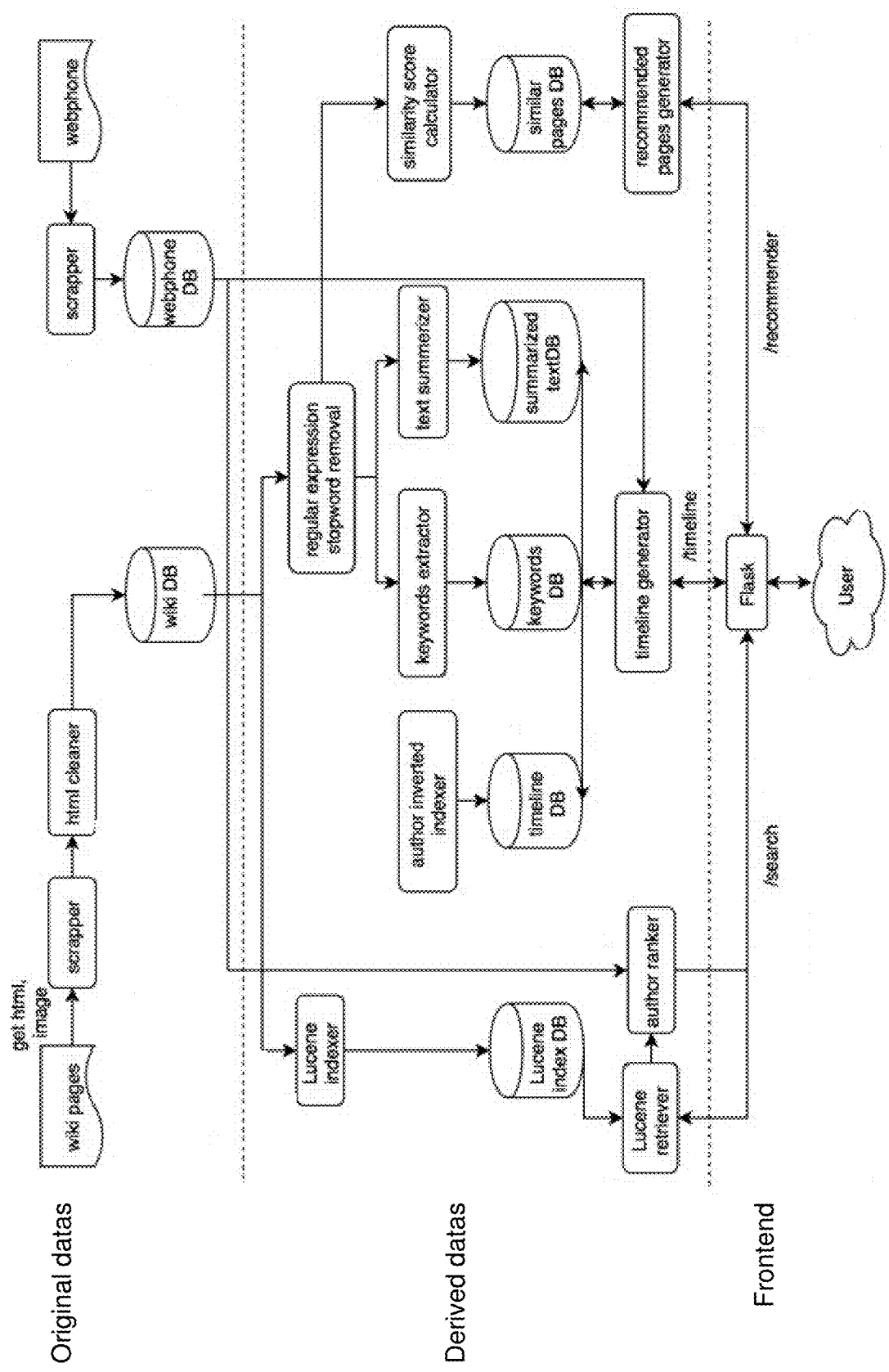
FIG. 10 depicts an illustrative embodiment of a data flow used in portions of the system described in FIGS. 6-9.

In one or more embodiments, natural language processing can be applied to the data, including remove stopwords, apply N-grams, POS (part-of-speech) tagging, TDIDF (term-frequency-inverse-document-frequency) to convert text into matrices, Keywords extraction using NMF (non-negative matrix factorization), RAKE (rapid automatic keywords extraction) with our modifications, LDA (latent dirichlet allocation), and/or text summarization such as using TextRank in Gensim package. Referring to FIG. 10, a flow chart 1000 is illustrated in which an original data set such as sourced from wiki pages and a webphone are processed to generate a derived dataset, such as accessible via search page 600, timeline 700, and recommender 800. Method 1000 includes performing indexing, summarizing, keyword extraction, and generating a timeline, among other things.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 500. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   monitoring, by a processing system including a processor, for storage of information via a first computing device of an entity as stored information in a memory accessible to the first computing device, wherein the information is generated via a user interface of the first computing device, and wherein the information is non-public information of the entity;
   determining, by the processing system, a subset of the information that satisfies an originality threshold based on a percentage of the stored information revised via the user interface;
   determining, by the processing system, whether the subset of the information satisfies a shareability criterion based on a type of the information;
   responsive to a determination that the subset of the information satisfies the originality threshold and the shareability criterion, generating, by the processing system, metadata that includes a first identification of a first user associated with generating the subset of the information via the user interface of the first computing device and a second identification of a topic of the subset of the information;
   storing, by the processing system, the metadata in a database with a group of other metadata that identifies topics and users associated with other information;
   receiving, by the processing system from a second computing device of the entity, a request for data;
   comparing, by the processing system, the data to the topics in the database according to a comparison criterion;
   responsive to a match between the data and the topic of the subset of the information, providing, by the processing system, the second computing device with access to the first identification of the first user and to the stored information; and
   adjusting, by the processing system, the metadata to indicate a level that the first user is a consumed user based on an amount of time that the second computing device accesses the stored information responsive to the second computing device accessing the stored information,
   wherein the monitoring for the storage of the information includes monitoring emails and messaging between multiple end user devices of the entity.

2. The method of claim 1, further comprising:
   responsive to the second computing device accessing the stored information, adjusting, by the processing system, the metadata to indicate that a second user of the second computing device is a learned user.

3. The method of claim 1, further comprising:
   monitoring, by the processing system, for communications between the first and second computing devices;
   responsive to detecting the communications, determining, by the processing system, whether the communications are associated with the stored information; and
   responsive to the communications being associated with the stored information, adjusting, by the processing system, the metadata to indicate that the first user and a second user of the second computing device are collaborating users.

4. The method of claim 1, further comprising:
   receiving, by the processing system from a third computing device of the entity, another request for other data;
   comparing, by the processing system, the other data to the topics in the database; and
   responsive to a match between the other data and the topics, providing, by the processing system, access by the third computing device to the first identification of the first user, an identification of a third user of the third computing device, the stored information in the memory of the first computing device, and other stored information in another memory of the second computing device, wherein the other stored information is associated with the stored information in the memory of the first computing device.

5. The method of claim 1, wherein the comparing of the data to the topics in the database comprises:
   determining, by the processing system, relevancy scores for each of the other information; and
   providing, by the processing system, the second computing device with the relevancy scores.

6. The method of claim 5, further comprising:
   determining, by the processing system, a keyword from a group of words in the request for data;
   determining, by the processing system, whether the keyword is included in descriptions of topics of the other information stored in the database; and
   responsive to a determination that the keyword is included in a first description, increasing, by the processing system, a relevancy score corresponding to first information associated with the first description.

7. The method of claim 1, wherein the monitoring for the storage of the information comprises monitoring sharing of computer code between multiple end user devices of the entity.

8. The method of claim 1, wherein the request for data includes a specification of an expertise, the method further comprising:
providing, by the processing system to the second computing device, a list of people who have the expertise with a matching score for each person, wherein the people include the first user; and
providing, by the processing system to the second computing device, skills that each person included in the list of people has,
wherein the skills are based on text mining a plurality of sources,
wherein the skills include demonstrated skills and declared skills,
wherein the demonstrated skills are weighted more than the declared skills, and
wherein the skills decay as a function of time.

9. The method of claim 8, wherein the demonstrated skills comprise skills obtained from projects that a respective person included in the list of people has worked on.

10. The method of claim 9, further comprising:
displaying, by the processing system, the projects as part of a timeline, a status of each of the projects, and at least one keyword for each of the projects;
receiving, by the processing system, a selection of a project included in the projects; and
responsive to receiving the selection of the project, displaying, by the processing system, a second project that is related to the project based on the keyword.

11. The method of claim 1, wherein the comparing of the data to the topics in the database comprises analyzing a correlation between the request for data and the topics in the database according to the comparison criterion.

12. A device, comprising:
a user interface;
a processing system including a processor; and
a memory that stores executable instructions that, when executed by the processing system, facilitate performance of operations, the operations comprising:
generating information via the user interface;
storing the information in the memory as stored information, wherein the storing of the information enables a system to generate metadata responsive to a determination by the system that the information satisfies an originality threshold based on a percentage of the stored information revised and a shareability criterion based on a type of the information, wherein the metadata includes a first identification of a first user associated with the information and a second identification of a topic of the information, and wherein the metadata is stored in a database with a group of other metadata that identifies topics and users associated with other information;
providing a second computing device with access to the stored information in the memory responsive to a first determination by the system of a match between a request for data from the second computing device and the topic of the information;
receiving a communication from the second computing device, wherein the communication causes the system to adjust the metadata to indicate that a first user of the device and a second user of the second computing device are collaborating users responsive to a second determination by the system that the communication is associated with the stored information; and
adjusting the metadata to indicate a level that the first user is a consumed user based on an amount of time that the second computing device accesses the stored information responsive to the second computing device accessing the stored information.

13. The device of claim 12, wherein the adjusting of the metadata to indicate that the first and second users are collaborating users comprises determining that the stored information was adjusted based on the communication.

14. The device of claim 12, wherein the metadata is adjusted to indicate that the second user is a learned user responsive to the second computing device accessing the stored information.

15. The device of claim 12, wherein the second computing device and the device are associated with an entity, and wherein access to the stored information is limited to end user devices associated with the entity.

16. A non-transitory, machine-readable medium, comprising executable instructions that, when executed by a processor of a second computing device of a second user, facilitate performance of operations, comprising:
generating a request for data;
providing the request for data to a system to enable the system to compare the data to metadata including topics of information stored in a database according to a comparison threshold, wherein the topics of information correspond to a plurality of stored information that the system has determined satisfies an originality threshold based on a percentage of a stored information of the plurality of stored information revised and a shareability criterion based on a type of the information, the metadata being updated responsive to the plurality of stored information satisfying the originality threshold and the shareability criterion;
receiving relevancy scores associated with a subset of the topics of information that were determined by the system based on the comparing;
providing a selection of a topic of information selected from among the subset of the topics of information to the system; and
responsive to the selection, receiving an identification of a first user that generated information corresponding to the topic of information and obtaining access to the information,
wherein the metadata is adjusted to indicate a level that the second user is a learned user based on an amount of time that the second computing device accesses the stored information responsive to the second computing device accessing the stored information.

17. The non-transitory, machine-readable medium of claim 16, wherein the relevancy scores are determined by:
determining a keyword from a group of words in the request for data;
determining whether the keyword is included in descriptions of the topics of the information stored in the database; and
responsive to a determination that the keyword is included in a first description, increasing the relevancy score corresponding to first information associated with the first description.

18. The non-transitory, machine-readable medium of claim 16, wherein the operations further comprise:
transmitting a communication from the second computing device to a first communication device of the first user that generated the information, wherein the communication causes the system to adjust the metadata to indicate that the first and second users are collaborating users responsive to a determination by the system that the communication is associated with the stored information.

19. The non-transitory, machine-readable medium of claim 16, wherein the metadata is adjusted to indicate that the first user is a consumed user responsive to the second computing device accessing the stored information.

20. The non-transitory, machine-readable medium of claim 16, wherein the second computing device is associated with an entity, and wherein access to the stored information is limited to end user devices associated with the entity.

\* \* \* \* \*